Aug. 29, 1944.                G. BARRETT                2,357,163
               STEP-BY-STEP CONTROLLING MECHANISM
                        Filed June 3, 1943
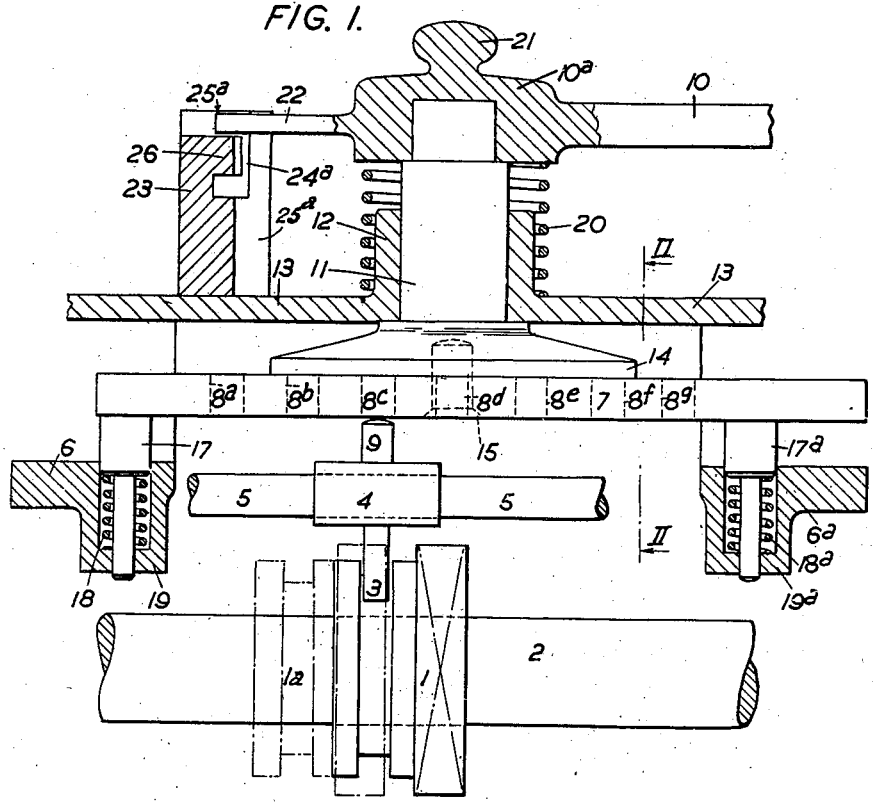
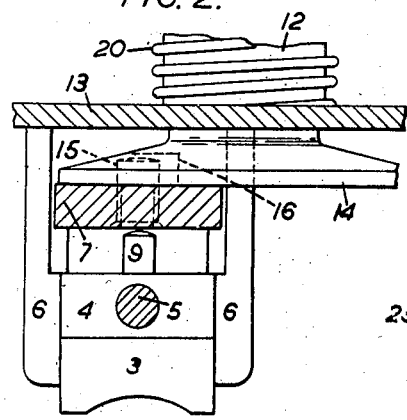
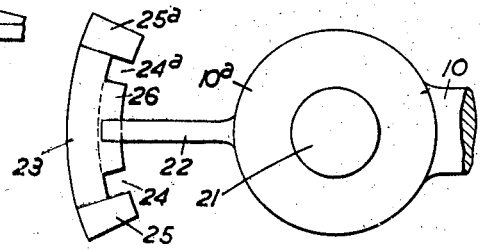
Inventor,
Guy Barrett
by Frank S. Appleman
                                                    Attorney.

Patented Aug. 29, 1944

2,357,163

UNITED STATES PATENT OFFICE 2,357,163

STEP-BY-STEP CONTROLLING MECHANISM

Guy Barrett, Market Harborough, England, assignor to Wycliffe Foundry & Engineering Co. Limited, Lutterworth, England, a British company Application June 3, 1943, Serial No. 489,549
In Great Britain June 9, 1942

12 Claims. (Cl. 74—491)

This invention relates to step-by-step controlling mechanisms and particularly to arrangements for moving a part of a mechanism through a predetermined distance in a rectilinear or angular direction.

In controlling the operation of certain machines it is often necessary to be able reliably to move a particular part through a definite distance, or a series of definite distances, and definitely to arrest the movement or each movement, as, for example, when changing from one of a set of gear wheels to another, or from one electrical contact to another, or for other similar purposes.

Where many such definite distances are comprised within the desired range of the mechanism, or when each distance is, in itself, relatively large, the aggregate distance to be covered by the movable part is so great that controlling mechanisms of the types hitherto employed become unwieldy and costly and difficult to manufacture.

For example, if the rectilinear or angular movement of a part to be moved through a predetermined distance be transmitted to that part as the result of movement of a point in a lever about its pivot, the total of the possible rectilinear movement which can be so transmitted is, in practice, often limited to that obtainable from a relatively small arc of movement of the point and cannot in any case exceed twice the distance between the point and the centre about which it is moved, or, in the case of angular movement to $\pi$ times twice the said distance.

Where rectilinear movement is produced by means of a screw and nut mechanism, inconvenience arises from the fact that the pitch of the thread of the screw is seldom such that the necessary movement of the nut corresponds to any convenient number of revolutions, or fraction of a revolution of the screw, and the indication of the position of the nut, and therefore of the movable part, if it is not in sight, is apt to be rather complicated.

If rack and pinion or ratchet gearing is used the projection of the rack or ratchet carrier beyond the mechanism towards the end of its travel often becomes inconvenient and cumbersome and adds materially to the space required to accommodate the mechanism.

The present invention comprises an improvement the object of which is to overcome these disadvantages and to enable any required number of rectilinear or angular movements of the movable part, step by step, to be provided for within, or practically within, the space occupied by the main mechanism.

According to the present invention, in order to move a part of a given mechanism to any one of a series of predetermined positions by means of a more or less remote control handle, lever, or other mechanical device, a selector furnished with a series of holes, notches or projections corresponding with the series of positions, and the movable part, provided with a projection, hole or notch, are arranged for relative to and fro movement, as well as for movement to the required predetermined extents, suchwise that when the said part is in any one of such positions it can be engaged with an appropriate one of the series of holes, notches or projections preparatory to movement to an adjacent position by the selector, and can be disengaged from the said hole, notch or projection after such movement.

The selector is so arranged that it can be moved backwards and forwards along a path adjacent to that of the movement of the movable part and through a distance equal to the interval between the centres of two adjacent holes, notches or projections, such intervals being hereinafter referred to as "steps."

A particular illustrative embodiment of the invention as applied to a change speed gear box will now be described with reference to the accompanying drawing, wherein, Figure 1 is a longitudinal sectional elevation of part of a gear box of the character aforesaid with the controlling mechanism in the inoperative position, Figure 2 is a fragmentary cross sectional elevation of the controlling mechanism taken on line II—II of Figure 1, and Figure 3 is a plan of part of the controlling handle or lever and the associated gate.

Referring to the drawing, in gear boxes of the character aforesaid it is required to move a sliding pinion 1 along a shaft 2 to a series of predetermined positions one of which is indicated by dot-and-dash lines 1a. This movement is imparted to the pinion by means of a slider 3, 4, mounted on a shaft 5 arranged parallel with the pinion shaft 2, and the problem becomes one of controlling the movement of the slider.

Mounted in guides 6, 6a in the gear box, within which it can slide in a manner to be described later herein, is a selector in the form of a bar 7 with a series of holes 8a—8g or notches therein corresponding in number and pitch with the positions to which the slider is to be moved. The selector 7 is so arranged that longitudinally it is parallel with the axis of the slider shaft 5 and so that it can be moved within the guides 6, 6a suchwise as to approach and recede from the slider. It can also move lengthwise in the guides in predetermined steps as hereinafter described but nevertheless always so that it remains parallel with the axis of the slider shaft.

The slider is fitted with a projecting pin 9 which extends towards the selector. Thus, when the selector is caused to approach the slider, the pin enters one or other of the holes or notches. This movement of the selector can be effected by any convenient means but in the present embodiment it is effected in the following manner. A handle or lever 10 is rigidly mounted on a pivot pin 11 which is free to rotate and to slide axially within a bearing 12 on the wall or cover 13 of the gear box. The lower end of the pivot pin 11 carries, rigidly attached to it, a disc 14 which is in facial contact with the selector 7 and is connected thereto by means of a pin 15 fixed in the selector and engaged with a radial slot 16 in the disc so as to constitute, in effect, a crank pin. When the handle or lever 10 is operated the disc 14 is turned through a given arc whereby the crank pin 15 causes the selector to slide lengthwise in its guides 6, 6a, through a distance limited as hereinafter described, and corresponding in length to the pitch of the holes or notches 8a—8g.

In order to disconnect the selector 7 from the slider 3, 4, and to enable it to remain parallel with the slider shaft it is yieldably mounted and pressed against the opposing face of the disc which is also parallel to the slider shaft, e. g., by means of spaced plungers 17, 17a, and associated springs 18, 18a, housed in bored bosses 19, 19a, in the gear box, or in any other convenient manner, and the said face of the disc is of such an area as to tend to distribute pressure evenly over the selector and thus tend to maintain the latter parallel with the slider shaft when in engagement with the slider.

A compression spring 20 is interposed between the boss 10a of the handle or lever 10 and the wall or cover 13 of the gear box, concentrically with the pivot pin 11, whereby the handle or lever and consequently the disc 14 are constrained to assume a position in which the selector is disengaged from the pin 9 as shown in Figures 1 and 2, the selector being maintained in contact with the disc by its associated plungers 17, 17a. This is the free position of the handle or lever. Therefore in this position movement of the handle or lever will not be transmitted to the slider. If, however, the pivot pin is pushed inwards axially by pressure on the boss of the handle or lever or a knob 21 thereon against the action of the spring 20 to an extent necessary to ensure engagement between the pin 9 and one of the holes or notches 8a—8g in the selector, operation of the handle or lever will cause the slider 3, 4 and with it the pinion 1 to be moved in the appropriate direction and to the required extent.

As regards turning movement the operative and free position of the handle or lever is limited and controlled by an arm 22 which is an extension of the handle or lever and by a control gate 23 which is formed with spaced gaps 24, 24a, stops 25, 25a, and a lip or projection 26 between the gaps.

The control gate is rigidly mounted on the wall or cover 13 in such a position that it lies conformably with an arc whose centre is coincident with that of the pivot pin 11 and at such radius therefrom as to provide that the end of the arm 22 can pass through the gaps 24, 24a from the outside of the gate to the inside, i. e., under the lip or projection 26, and vice versa. The height of the projection 26 from the wall or cover 13 and its thickness are such that when the arm is on the outside of the gate the pin 9 is not in engagement with any of the holes or notches 8a—8g, i. e., the handle or lever is in the free position as shown in Figures 1 and 3. When the arm is on the inside of the gate the pin 9 is fully engaged with one of the holes or notches. This is the position hereinbefore referred to as the "operative position." Moreover, the position of the gaps 24, 24a is such that when the arm is in register with either of them the pin 9 registers with one or other of the holes or notches. The stops 25, 25a are so located that the movement of the arm cannot extend beyond the point at which it is in register with one or other of the gaps and therefore is such that if the handle or lever is moved through the full extent of its permitted movement, when in the operative position, the movement of the selector will be that required to move the slider 3, 4, through a distance equal to the pitch of the holes or notches, and, therefore, to bring the slider into register with the next required position. The slider can be retained in this position in any suitable manner, as, for instance, by a spring loaded plunger seating in holes pitched to correspond with the predetermined positions. It will be realized, however, that the spacing of the gaps and of the stops could be made adjustable to suit a prearranged unequal pitching of the notches and, therefore, to suit an unequal spacing of the positions.

When the arm 22 is passed downwards through a gap into the operative position, the arcuate movement of the handle or lever is transmitted to the slider and the direction of the movement of the slider will be determined by the direction in which the arm is moved between the gaps. Therefore the slider, and with it the pinion, can be moved step by step in either direction throughout the whole range of their permitted movement along their respective shafts.

Although for convenience the particular illustrative embodiment of the invention has been described as applied to gear boxes of the character hereinbefore described, it will be understood that the invention can be applied to any purpose where it is desired to impart movement in a given number of steps of predetermined length in a predetermined rectilinear or angular direction to any given movable part of a mechanism.

Variations may be made as regards constructional details without exceeding the scope of the invention. For example, the axial movement of the pivot pin could equally well be effected by the action of a wedge or cam applied through an auxiliary handle connected with the handle or lever.

Similarly, although according to the foregoing description the approach and withdrawal of the selector in relation to the slider is effected by axial movement of the pivot pin against and under spring action, it will be understood that this approach and withdrawal could be effected by any other suitable means, for example, eccentrics or cams interposed between the slider shaft and the selector and operable through the wall or cover of the box, or by means of wedges or screws similarly interposed, and by these positive means the use of the springs could be avoided.

Similarly the longitudinal movement of the selector in its guides could be effected by any other means than those described, provided that the movement of the selector is definite and limited to the extent required to move the slider step by step from one position to the next.

It will also be realized that the selector could be curved to conform with the circumference, or with a portion of the circumference of a circle in relation to positions evenly spaced about that circle, or part of a circle, and the slider could likewise be arranged to move in a corresponding circular path.

In any case it will be perceived that it will be impossible for the slider to be moved to any other than the next adjacent position at one operation, and that, accordingly, a pause between changes from position to position is absolutely assured.

Instead of a disc, such as 14, a presser member or plate of any other appropriate form may be adopted for the purpose of transmitting the movements of the handle or lever to the selector.

What I claim then is:

1. A step-by-step controlling mechanism comprising, in combination, a part adapted to be moved step-by-step to predetermined positions, a selector having a series of formations which correspond with the said positions and are adapted for interengagement one at a time with a complementary formation on the said movable part, the selector and the said part being arranged for relative approaching and receding movement as well as for movement to the required predetermined extents, means for effecting the said relative movement, means for shifting the selector from one position to another, and means for limiting the shift of the selector to that required to move the said part from one position to the next, said means being also adapted to permit of engagement of the said part and the selector prior to shifting and to permit of disengagement of the part and selector after shifting.

2. A step-by-step controlling mechanism comprising, in combination, a part adapted to be moved step-by-step to predetermined positions, a selector having a series of formations which correspond with the said positions and are adapted for interengagement one at a time with a complementary formation on the said movable part, said selector being movable towards and away from the movable part, a pivoted handle for controlling the selector, and an associated gate which limits pivotal movement of the handle to a prearranged extent and controls the movement of the selector towards and away from the movable part, whereby when the handle is in the operative position an appropriate one of the series of selector formations is engaged with the movable part such wise that the limited pivotal movement of the handle is transmitted through the selector to the movable part and the extent of each transmitted movement is limited to that required to move the said part from one position to the next, while, when the handle is in a free position in relation to the gate no movement of the handle is transmitted to the said part, all for the purpose herein described.

3. A step-by-step controlling mechanism comprising, in combination, a part adapted to be moved step-by-step to predetermined positions, a spring controlled selector having a series of formations which correspond with the said positions and are adapted for interengagement one at a time with a complementary formation on the said movable part, a pivoted handle for controlling the selector, a spring controlled axially movable pivot upon which said handle is mounted, a member which is associated with the pivot and arranged in operative connection with the selector, and a gate which limits pivotal movement of the handle to a prearranged extent and controls movement of the selector towards and away from the movable part respectively against and under the spring action, the construction and arrangement being such that by axial movement of the pivot and hence also of the selector against the spring action an appropriate one of the selector formations is pressed into engagement with the movable part whereupon by rotation of the pivot by the handle the selector is moved operatively to effect a movement of the aforesaid part to an adjacent position, and upon relief of the pressure the selector and the movable part are disengaged as the result of the counteraction of the springs when the handle is in a free position in relation to the gate.

4. A step-by-step controlling mechanism comprising, in combination, a part adapted to be moved step-by-step to predetermined positions, a selector constituted by a longitudinally slidable bar with a series of holes therein corresponding in number and pitch with said positions, said bar being also movable so as to approach and recede from the movable part which latter is furnished with a projection which extends towards the bar whereby when said bar is moved toward the movable part the projection enters one of the aforesaid holes, a pivoted handle for controlling the selector, and an associated gate which limits pivotal movement of the handle to a prearranged exent and controls the movement of the selector towards and away from the movable part, whereby when the handle is in the operative position an appropriate one of the series of holes receives the projection such wise that the limited pivotal movement of the handle is transmitted through the selector to the movable part and the extent of each transmitted movement is limited to that required to move the said part from one position to the next, while, when the handle is in a free position in relation to the gate no movement of the handle is transmitted to the said part, all for the purpose herein described.

5. A step-by-step controlling mechanism comprising, in combination, a part adapted to be moved step-by-step to predetermined positions, a selector constituted by a spring controlled longitudinally slidable bar with a series of holes therein corresponding in number and pitch with said positions, said holes being adapted for interengagement one at a time with a projection on the said movable part, a pivoted handle for controlling the selector, a spring controlled axially movable pivot upon which said handle is mounted, a member which is associated with the pivot and arranged in operative connection with the selector, and a gate which limits pivotal movement of the handle to a prearranged extent and controls movement of the selector towards and away from the movable part respectively against and under the spring action, the construction and arrangement being such that by axial movement of the pivot and hence also of the selector against the spring action an appropriate one of the holes receives the projection whereupon by rotation of the pivot by the handle the selector is moved operatively to effect a movement of the aforesaid part to an adjacent position, and upon relief of the pressure the selector and the movable part are disengaged as the result of the counteraction of the springs when the handle is in a free position in relation to the gate.

6. A step-by-step controlling mechanism comprising, in combination, a part adapted to be moved step-by-step to predetermined positions, a selector having a series of formations which correspond with the said positions and are adapted for interengagement one at a time with a complementary formation on the said movable part, said selector being movable towards and from the movable part, a pivoted handle for controlling the selector, a pivot pin upon which said handle is mounted, a bearing in which said pin is free to rotate and slide axially, a disc carried by the pivot pin, said disc being in facial contact with the selector and connected thereto by means of a pin and slot, and a gate which limits pivotal movement of the handle to a prearranged extent and controls the movement of the selector towards and away from the movable part, whereby when the handle is in the operative position an appropriate one of the series of selector formations is engaged with the movable part so that upon the handle being turned through a given arc the pin moves the selector and hence also the movable part lengthwise to a limited extent corresponding to the pitch of the selector formations and when the handle is in a free position in relation to the gate the selector is disengaged from the movable part while remaining in contact and connection with the disc so that no movement of the handle is transmitted to the said part, all for the purpose herein described.

7. A step-by-step controlling mechanism comprising, in combination, a part adapted to be moved step-by-step to predetermined positions, a spring controlled selector having a series of formations which correspond with the said positions and are adapted for interengagement one at a time with a complementary formation on the said movable part, a pivoted handle for controlling the selector, a spring controlled pivot pin upon which said handle is mounted, a bearing in which said pin is free to rotate and slide axially, a disc carried by the pivot pin, said disc being in facial contact with the selector and connected thereto by means of a pin and slot, and a gate which limits pivotal movement of the handle to a prearranged extent and controls movement of the selector towards and away from the movable part respectively against and under the spring action, the construction and arrangement being such that by axial movement of the pivot against the spring action an appropriate one of the selector formations is pressed into engagement with the movable part whereupon by rotation of the pivot pin by the handle through a given arc the pin moves the selector and hence also the movable part lengthwise to a limited extent corresponding to the pitch of the selector formations, and upon relief of the pressure the selector and the movable part are disengaged as the result of the counteraction of the springs when the handle is in a free position in relation to the gate, so that no movement of the handle is then transmitted to the said part, the selector, however, meanwhile remaining in contact and connection with the disc, all as and for the purpose herein described.

8. A step-by-step controlling mechanism comprising, in combination, a part adapted to be moved step-by-step to predetermined positions, a selector having a series of formations which correspond with the said positions and are adapted for interengagement one at a time with a complementary formation on the said movable part, guides for the selector, spaced plungers and associated springs whereby the selector is yieldably mounted in the guides, said selector being movable towards and away from the movable part respectively against and under the spring action, a pivoted handle for controlling the selector, and an associated gate which limits pivotal movement of the handle to a prearranged extent and controls the movement of the selector towards and away from the movable part, whereby when the handle is in the operative position an appropriate one of the series of selector formations is engaged with the movable part suchwise that the limited pivotal movement of the handle is transmitted through the selector to the movable part and the extent of each transmitted movement is limited to that required to move the said part from one position to the next, while, when the handle is in a free position in relation to the gate no movement of the handle is transmitted to the said part, all for the purpose herein described.

9. A step-by-step controlling mechanism comprising, in combination, a part adapted to be moved step-by-step to predetermined positions, a selector having a series of formations which correspond with the said positions and are adapted for interengagement one at a time with a complementary formation on the said movable part, guides for the selector, spaced plungers and associated springs whereby the selector is yieldably mounted in the guides, a pivoted handle for controlling the selector, a spring controlled axially movable pivot upon which said handle is mounted, a member which is associated with the pivot and arranged in operative connection with the selector, and a gate which limits pivotal movement of the handle to a prearranged extent and controls movement of the selector towards and away from the movable part respectively against and under the spring action, the construction and arrangement being such that by axial movement of the pivot and hence also of the selector against the spring action an appropriate one of the selector formations is pressed into engagement with the movable part whereupon by rotation of the pivot by the handle the selector is moved operatively to effect a movement of the aforesaid part to an adjacent position, and upon relief of the pressure the selector and the movable part are disengaged as the result of the counteraction of the springs when the handle is in a free position in relation to the gate.

10. A step-by-step controlling mechanism according to claim 2, wherein the handle is controlled by an arm and associated gate which latter is formed with spaced gaps, stops and an intermediate lip whereby, when the arm is on the outside of the gate, the selector is disengaged from the movable part, and, when the arm is on the inside of the gate, the said selector and movable part are engaged, while, in either position, the turning movement of the handle and consequently movement of the selector and movable part, when engaged, is limited by the stops, the gaps and stops being so located as to correspond with the pitch of the selector formations whereby when the arm is in register with either of the gaps the selector is in position to engage with the movable part.

11. In a gear box furnished with a sliding pinion, a step-by-step controlling mechanism comprising, in combination, a slider adapted to be moved step-by-step to predetermined positions in engagement with the said sliding pinion, a selector having a series of formations which correspond with the said positions and are adapted for interengagement one at a time with a complementary formation on the slider, and means for operating said selector, the latter and the slider being arranged for relative approaching and receding movement as well as for movement to the required predetermined extents suchwise that when the slider is in any one of such positions it can be engaged with an appropriate one of the series of selector formations preparatory to being moved to an adjacent position by the selector and can be disengaged from the said selector formation after such movement, for the purpose herein described.

12. In a gear box a step-by-step controlling mechanism comprising a slider formed with a projection and movable step-by-step to a series of predetermined positions, a shaft upon which the slider is mounted, a spring controlled selector constituted by a longitudinally slidable bar with a series of holes therein corresponding in number and pitch with said positions, said bar being also movable so as to approach and recede from the slider whereby when said bar is moved against the spring action towards the slider the aforesaid projection enters one of the holes, a pivoted handle for controlling the selector, a spring controlled pivot pin upon which said handle is mounted, a bearing in which said pin is free to rotate and slide axially, a disc carried by the pivot pin, said disc being in facial contact with the selector and connected thereto by means of a pin and slot, and a gate which limits pivotal movement of the handle to a prearranged extent and controls movement of the selector towards and away from the slider respectively against and under the spring action, the construction and arrangement being such that by axial movement of the pivot against the spring action the projection on the slider is caused to enter an appropriate one of the holes in the selector bar whereupon by rotation of the pivot pin by the handle through a given arc the pin moves the selector and hence also the slider lengthwise to a limited extent corresponding to the pitch of the holes, and upon relief of the pressure the selector and the slider are disengaged as the result of the counteraction of the springs when the handle is in a free position in relation to the gate, so that no movement of the handle is then transmitted to the slider, the selector, however, meanwhile remaining in contact and connection with the disc, all for the purpose herein described.

GUY BARRETT.